United States Patent [19]

Pritt

[11] Patent Number: 4,864,574
[45] Date of Patent: Sep. 5, 1989

[54] INJECTION LOCK CLOCK DETECTION APPARATUS

[75] Inventor: Harley P. Pritt, Rowlett, Tex.

[73] Assignee: Rockwell International Corporation, Dallas, Tex.

[21] Appl. No.: 152,080

[22] Filed: Feb. 4, 1988

[51] Int. Cl.$^4$ ............................................. G06F 11/00
[52] U.S. Cl. ....................................... 371/61; 307/269
[58] Field of Search .......................... 371/61; 307/269; 375/118, 120

[56]  References Cited

U.S. PATENT DOCUMENTS

| | | | |
|---|---|---|---|
| 3,530,663 | 9/1970 | Marti | 371/61 |
| 3,803,568 | 4/1974 | Higashide | 371/61 |
| 4,330,862 | 5/1982 | Smolik | 375/114 |
| 4,419,739 | 12/1983 | Blum | 364/900 |
| 4,534,044 | 8/1985 | Funke et al. | 375/120 |
| 4,667,328 | 5/1987 | Imran | 371/61 |

Primary Examiner—Charles E. Atkinson
Attorney, Agent, or Firm—Dennis T. Griggs

[57] ABSTRACT

A clock signal produced by a master oscillator is monitored continuously by a detector circuit having a local oscillator which is stabilized in frequency by injection of the master clock signal. The master clock signal is first divided and the divided clock signal is then retimed by the stabilized lock clock signal. The retimed, divided clock signal is then shifted by one complete clock cycle. If the master oscillator clock signal is valid, the retimed clock signal and its shifted counterpart will always assume opposite logic values. The detector circuit generates a logic output signal which assumes a logic 0 value when the two signals are in opposite states, indicating a valid clock condiiton, and a logic 1 value when the signals have the same logic state, indicating an invalid clock condition.

12 Claims, 3 Drawing Sheets

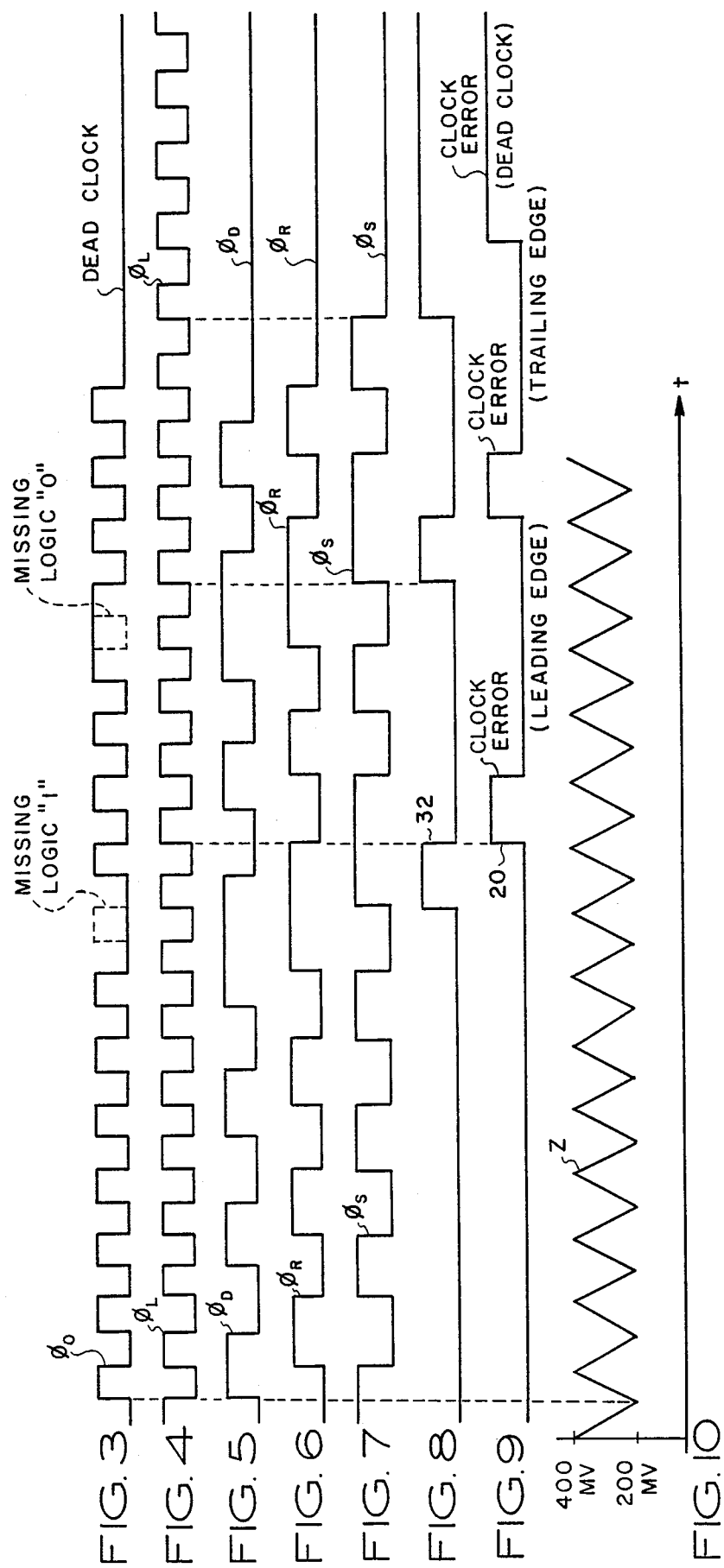

INJECTION LOCK CLOCK DETECTION APPARATUS

FIELD OF THE INVENTION

This invention relates generally to synchronous data transfer, and in particular to apparatus for detecting malfunction of a clock oscillator.

BACKGROUND OF THE INVENTION

In data processing systems, data signals are input to a central processor from one or more sources. In such systems the transfer of data is synchronized with respect to a common clock referred to as a master clock. That is, the master clock is the timing reference for all processing operations, including input, manipulation and out-processing. The principal functional sections of the processor communicate with each other through signals that represent data, instructions and control signals. The order, timing and direction in which information flows within and between the functional sections of the processor are synchronized with the master clock. It will be appreciated that a direct failure of the master clock will interrupt the transfer and processing of data, and an indirect malfunction or invalid clock signal will cause loss of data or the transmission of invalid data.

The stability of the pulses produced by the master clock is critical when a flip-flop is used to transfer data. In such operations, there is a certain period of time during which the data signal must remain stable relative to the rising clock edge input to establish an accurately timed output. For instance, the data signal must have assumed a logic 1 value for a certain amount of time prior to the onset of the clock rising edge and must maintain the logic 1 value and not transition to a logic 0 for a certain period of time after the rising clock signal has achieved logic 1 value. The foregoing clock/data timing constraints must be observed to obtain valid data synchronization so that the output data signal is a faithful and accurate representation of the input data signal.

DESCRIPTION OF THE PRIOR ART

The reliability of clock oscillator circuitry is continuously being improved. However, circuit failures may occur to cause a clock malfunction. A typical failure mode of a clock is a direct circuit failure in which the clock output remains constant at logic 1 or logic 0. Other direct failure modes include variation of clock frequency or phase induced by aging of components and temperature induced variations. Additionally, some clock malfunctions are induced by external system factors which coincide at some periodic rate to produce a clock malfunction such as an extra bit, a missing bit or a phase shifted bit.

Because transmission integrity is dependent upon a stable clock, redundant clocks and data processing circuitry are maintained in a standby mode for substitution in response to a system failure. Many such failures are caused by a direct malfunction of the master clock. It will be appreciated that troubleshooting a system failure can be expedited by the early identification of a master clock malfunction. Additionally, in most instances a standby master clock can be substituted quickly and at less expense than replacing one or more processor boards. Accordingly, it would be useful to be able to detect a direct failure or malfunction of the master clock on a real time basis.

OBJECTS OF THE INVENTION

There is a continuing interest in improving synchronous data transfer and processor systems, and in particular in improving the validity of data transmission and processing.

Accordingly, it is a general object of the present invention to provide a circuit for validating the stability of a master clock and for detecting and reporting a malfunction of the master clock on a real time basis.

A related object of the invention is to provide a circuit which continuously monitors an external clock signal and automatically provides an indication of clock error, without interfering with or otherwise interrupting the transfer of data.

Yet another object of the invention is to provide a circuit for monitoring the performance of a clock signal which can detect a direct failure involving the absence of clock transitions, and an indirect failure or malfunction induced by external system conditions which produce marginal clock conditions including a missing logic 1, a missing logic 0 or a phase shifted clock pulse.

SUMMARY OF THE INVENTION

The foregoing objects are achieved according to the present invention in which a clock signal from a master oscillator is monitored continuously by a detector circuit having a local oscillator which is stabilized in frequency by injection of the master clock signal. The master clock signal is divided to produce a divided clock signal having a longer period, preferably equal to two complete cycles of the master clock signal. The stabilized output of the local oscillator is then used to clock a pair of shift registers to retime and shift the divided clock signal. The retimed, divided clock signal is compared with the retimed, divided clock signal shifted by one clock cycle. If the master clock is functioning correctly, the divided clock signal and its phase shifted counterpart will always assume opposite logic states.

If the clock being tested contains a missing clock bit, an extra clock bit or a phase shifted clock bit, the local oscillator will continue to oscillate and the comparison signals will be of the same state, thereby indicating a clock error. By this arrangement, an error output is generated which remains at logic 1 for as many periods as are missed in the master clock signal being tested. Thus, the monitoring circuit detects the periodic absence of master clock bits and the total absence of the master clock signal.

In the preferred embodiment, the local oscillator is a free-running relaxation oscillator, and its frequency of oscillation is locked to the master clock by injecting the master clock signal into the relaxation oscillator. The free-running, unforced frequency of the relaxation oscillator is selected to be substantially equal to the frequency of the master clock.

Operational features and advantages of the present invention will be appreciated by those skilled in the art upon reading the detailed description which follows in connection with the attached drawings.

BRIEF DESCRIPTION OF THE DRAWINGS

FIG. 3 is a timing diagram of a master local oscillator waveform;

FIG. 4 is a timing diagram of the inverted local oscillator waveform which is referred to herein as the lock clock signal;

FIG. 5 is a timing diagram of the master clock oscillator waveform divided by two;

FIG. 6 is a timing diagram of the divided master clock waveform which has been retimed by the lock clock signal;

FIG. 7 is a timing diagram of the retimed, divided master clock shifted by the lock clock signal;

FIG. 8 is a timing diagram of the logical output of an exclusive NOR gate which compares the retimed and divided master clock after it has been shifted by one bit;

FIG. 9 is a timing diagram of the logical output of a latch which indicates clock error events corresponding to a missing logic 1 output, a missing logic 0 output, and a dead master clock, respectively; and, FIG. 10 is a timing diagram of the injection signal Z derived from the master clock and applied as a forcing input to the local oscillator.

DETAILED DESCRIPTION OF THE PREFERRED EMBODIMENT

Figure 1:
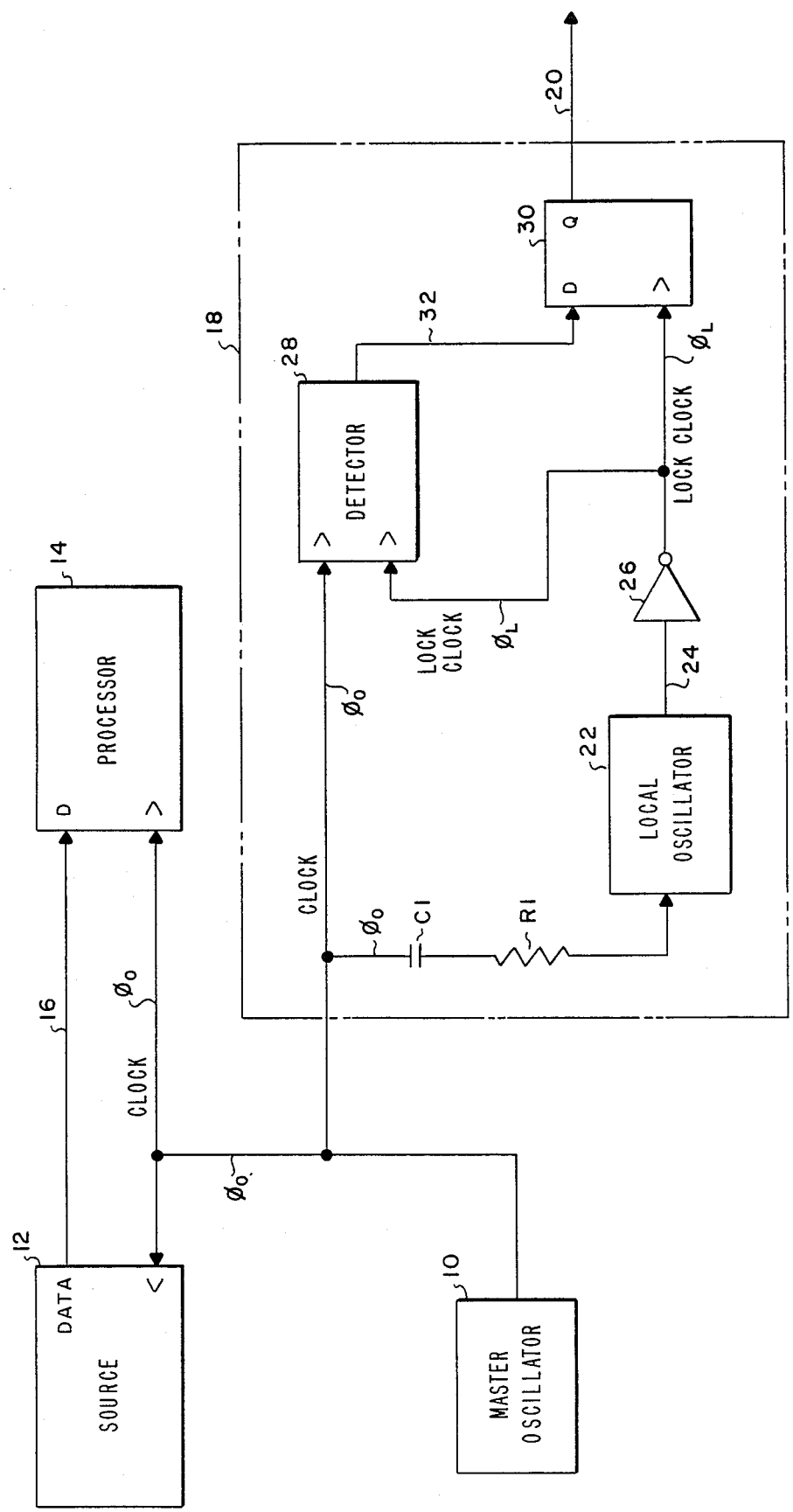
FIG. 1 is a simplified block diagram in which the clock monitoring circuit of the present invention is shown in combination with a synchronous data transmission system.

In the description which follows, like parts are indicated throughout the specification and drawings with the same reference numerals, respectively.

Referring now to FIG. 1 of the drawings, a master oscillator 10 supplies a master clock signal $\phi_o$ for synchronizing the transfer of data from a data source 12 to a processor 14. A digital data signal DATA is conducted via a signal conductor 16 from the data source 12 to a data terminal D of the processor 14. The clock signal $\phi_o$ is applied simultaneously to the clock input terminal (>) of the source 12 and the clock input terminal (>) of the processor 14. The master clock signal $\phi_o$ serves as the timing reference for all processing operations, including data manipulations and out-processing.

It will be appreciated that a failure of the master oscillator 10 will interrupt the transfer and processing of data, and that an invalid master clock signal $\phi_o$ will cause loss of data or transmission of invalid data. According to the present invention, a monitoring circuit 18 continuously monitors the master clock signal $\phi_o$ and produces a clock condition signal 20 which corresponds with the valid or invalid operating condition of the master oscillator 10 substantially on a real time basis.

Figure 2:
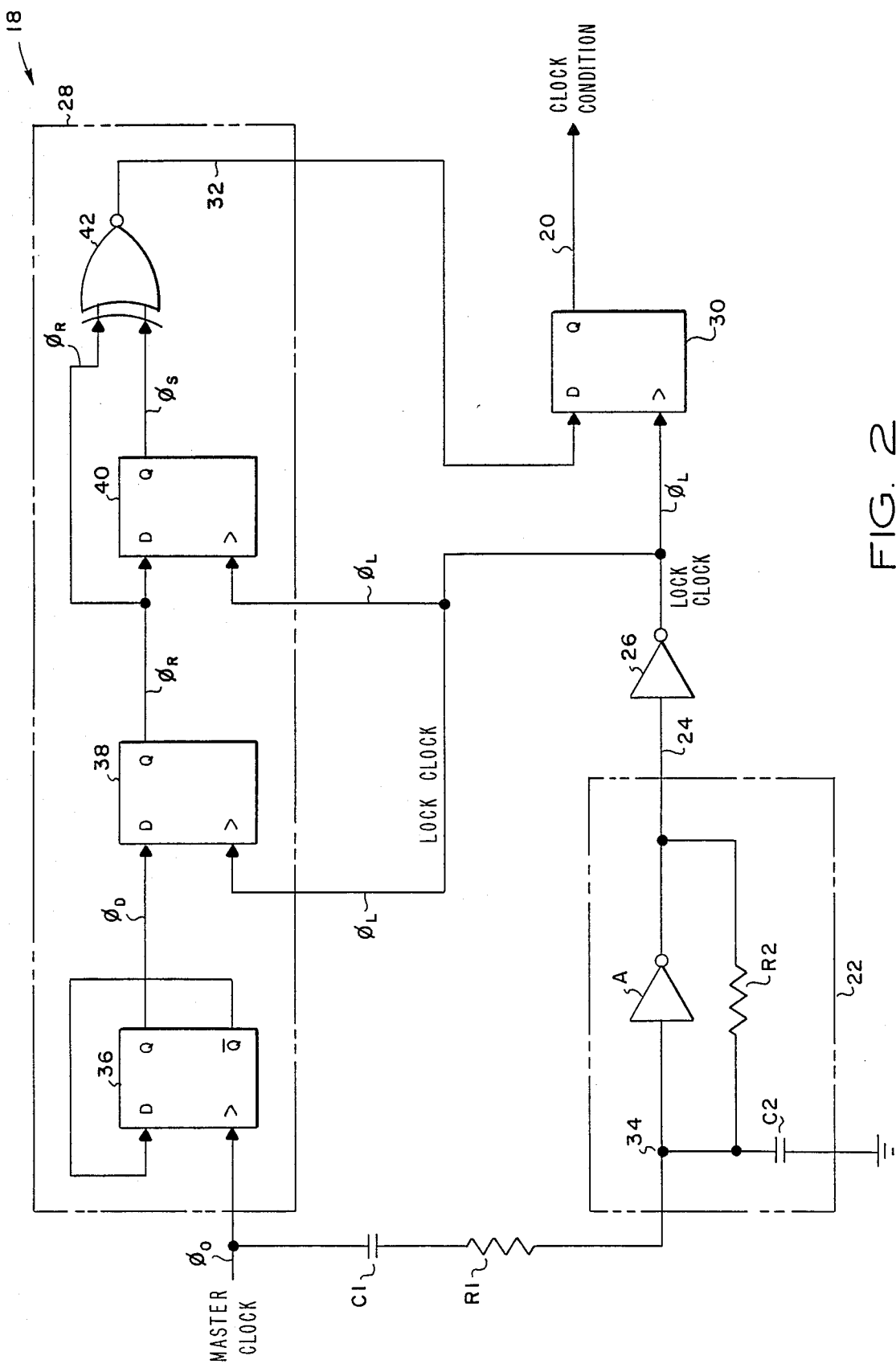
FIG. 2 is a simplified circuit diagram of the clock monitoring circuit shown in FIG. 1.

The master clock signal $\phi_o$ is injected into a local oscillator 22 through a DC isolation capacitor C1 and a resistor R1. The local oscillator 22 is a free running relaxation oscillator whose frequency is determined by the time constant produced by an inverter amplifier A and the feedback resistor/capacitor combination R2, C2 as indicated in FIG. 2. According to an important feature of the invention, the unforced, natural frequency of the local oscillator 22 is adjusted to be substantially equal to the frequency $F_o$ of the master oscillator clock signal $\phi_o$. For example, for a master oscillator clock frequency $F_o = 26.624$ MHZ, R2 = 470 ohms and C2 = 190 picofarad, which yields a local oscillator frequency $F_L = 26.624$ MHZ.

The master oscillator clock signal $\phi_o$ is injected into the local oscillator 22 through resistor R1 and becomes the forcing reference for the local oscillator 22. That is, the negative feedback provided by the gain of inverter amplifier A conducted through resistor R2 and capacitor C2 is combined with the forcing injection signal Z conducted through R1 as C2 charges and discharges to cause the output 24 of the oscillator 22 to be exactly synchronized with the master oscillator clock signal $\phi_o$. In the absence of the master oscillator clock signal $\phi_o$, the local oscillator 22 continues in its free running, unforced oscillating state to produce clock pulses at substantially the same frequency, $F_L = F_o$, as produced by the master oscillator 10.

The output 24 of the local oscillator 22 is inverted by an inverter amplifier 26 to produce a lock clock signal $\phi_L$ for gating a detector circuit 28 and a latch 30 to implement the logical comparison of the invention as discussed below.

The incoming master clock signal $\phi_o$ applied to the master clock input terminal (>) of detector 28 is first divided and retimed by the lock clock signal $\phi_L$, and the retimed, divided clock signal is then shifted by one complete clock cycle. As used herein, one complete clock cycle is defined as one bit. If the master oscillator clock signal $\phi_o$ is valid, the retimed clock signal and its shifted counterpart will always be in opposite states. The detector 28 generates a logic output signal 32 which assumes a logic 0 value when the two signals are in opposite states, indicating a valid clock condition, and a logic 1 value when the signals have the same logic state, indicating an invalid clock condition.

Referring now to FIG. 2 and FIG. 10, an injection signal Z is applied to the input node 34 of local oscillator 22. The injection signal Z is a triangular waveform which transitions between minimum and maximum voltages needed for inducing oscillations, for example 200 millivolts and 400 millivolts, respectively. The injection waveform Z is generated by the charging and discharging of capacitor C2 as current is conducted through DC isolation capacitor C1 and resistor R1. In the preferred embodiment, the capacitance value of the DC isolation capacitor C2 is 0.1 microfarad and the resistance value of resistor R1 is 2,200 ohms.

The resistors R1 and R2 form a voltage divider circuit at the input node 34, and the ratio R1/R2 controls the capture range of the injection lock. The ratio R1/R2 is selected so that the injection signal Z will have a forcing and overriding effect on the local oscillator 22, causing its output 24 to be exactly synchronized with the master clock signal $\phi_o$.

Referring now to FIG. 2, FIG. 3 and FIG. 5, the master clock signal $\phi_o$ is input to the clock terminal (>) of a bistable multivibrator 36, which preferably is a DQ flip-flop. As used herein, the "DQ flip-flop" is a variation of the J-K flip-flop which is triggered on an edge of the clock waveform. Feedback is used internally within the J-K circuit such that the indeterminate state, when both inputs are equal to logic 1, is avoided. The DQ flip-flop has a single input, and an internal inverter circuit provides two signals to the J and K inputs so that it operates as a J-K flip-flop, having a single input with only two input modes. In the first input mode, when the D input is logic 0, the Q output is logic 0 and the complement output, $\overline{Q}$, is logic 1 in response to a rising transition of the clock pulse. In the second input mode, when the data input terminal D is logic 1, the data output terminal Q is logic 1 and the complement data output terminal $\overline{Q}$ is logic 0 in response to a rising transition of the clock pulse.

The DQ flip-flop 36 is connected to perform a dividing function, with its output Q being connected directly to the data input terminal D of DQ flip-flop 36. As a result of the foregoing $\overline{Q}$−D interconnection, the Q output of the DQ flip-flop 36 produces a waveform $\phi_D$ which is a symmetrical square wave having a frequency of one-half of the clock signal $\phi_o$, and having a period equal to two $\phi_o$ clock cycles. According to this arrangement, when the master clock waveform $Q_0$ is regular and symmetrical, the $\phi_D$ waveform is also symmetrical and assumes stable logic 1 and logic 0 values during each pair of successive master clock bits.

Each half bit of the divided clock $\phi_D$ corresponds exactly with one complete bit of the master clock signal $\phi_o$. Since the rising edge of the divided clock $\phi_D$ is synchronized with the rising edge of the master clock signal $\phi_o$, the logic value $\phi_D$ of undergoes a positive transition once and only once during each complete cycle of the master clock signal $\phi_o$. Because the logic value of the divided clock $\phi_D$ transitions only in response to a rising transition of the master clock signal $\phi_o$, a missing logic "1" half bit or a missing logic "0" will effectively extend the period of the divided clock signal $\phi_D$, with the result that the clock bits of the divided clock $\phi_D$ which are coincidental with a leading edge clock error or a trailing edge clock error will no longer be symmetrical with the divided clock signal bits occurring immediately prior to the clock error event. A logical comparison of the symmetrical portion with the non-symmetrical portion of the divided clock waveform $\phi_D$ provides an indication of a master clock error event.

After the divided clock signal $\phi_D$ has been produced, it is applied to the data input terminal D of a DQ flip-flop 38. The DQ flip-flop 38 is triggered by the rising transition of lock clock signal $\phi_L$, with the result that the divided clock signal $\phi_D$ is retimed and shifted by one-half bit. That is, instead of being triggered by transitions of the master clock $\phi_o$, the divided clock $\phi_D$ is toggled by rising transitions of the lock clock $\phi_L$. Lock clock $\phi_L$ is stable and continues to produce logic 1 and logic 0 transitions at the same frequency of the master clock $\phi_o$. According to this arrangement, a retimed clock signal $\phi_R$, as illustrated in FIG. 6, corresponds exactly with the divided clock $\phi_D$, but is phase shifted by one-half bit. That is, the symmetrical portions and the non-symmetrical portions of the divided clock waveform are preserved for comparison purposes, and are gated by the stable lock clock signal $\phi_L$.

Referring now to FIG. 2 and FIG. 7, the retimed clock $\phi_R$ is applied to the data terminal D of a DQ flip-flop 40. The DQ flip-flop 40 is gated by the lock clock $\phi_L$, with the result that an output signal $\phi_S$ is produced which is phase shifted by one complete cycle of the retimed clock $\phi_R$ waveform. By inspection of FIG. 6 and 7, it will be seen that the waveform of the retimed clock $\phi_R$ and the waveform of the shifted clock $\phi_S$ are exactly 180° out of phase when the master clock signal $\phi_o$ and the divided clock $\phi_D$ are regular and symmetrical. That is, during the intervals of symmetry, when the retimed clock assumes a logic 1 value, the shifted clock waveform $\phi_S$ assumes a logic 0 value.

The logical values of the retimed clock $\phi_R$ and the shifted clock $\phi_S$ are applied as inputs to an exclusive NOR gate 42 for comparison purposes. The exclusive NOR gate 42 has a logical output which assumes a value of logic 1 if and only if both of its inputs are identical. That is, the exclusive NOR gate 42 produces a logic 1 output only when $\phi_R$ and $\phi_S$ have both assumed a logic 1 value, or when both have assumed a logic 0 value. The logic output of the exclusive NOR gate 42 is logic 0 at all other times, that is when the retimed clock $\phi_R$ and the shifted clock $\phi_S$ have assumed different logical values. Accordingly, the logic output of the exclusive NOR gate 42 assumes a logic 0 condition in response to a symmetrical and regular master clock waveform $\phi_o$, but switches to a logic 1 output in response to a clock error event such as a missing logic "1" bit or a missing logic "0" bit.

The effect of a missing logic "1" bit as represented in the master clock waveform $\phi_o$ shown in FIG. 3 results in an extension of the logic 1 bit of the divided clock $\phi_D$ waveform shown in FIG. 5. The logic 1 value of the $\phi_D$ waveform continues for one complete cycle of the master clock $\phi_o$ since it will not transition to logic 0 until the occurrence of the next rising edge of the master clock $\phi_o$, which occurs one full cycle later. This non-symmetrical extension of the divided clock $\phi_D$ is preserved in the retimed clock $\phi_R$. As a result, the retimed clock $\phi_R$ and the shifted clock $\phi_S$ both assume a logic 1 value for one complete cycle of the lock clock $\phi_L$ which occurs immediately following the trailing edge of the missing logic "1" bit. The logic 1 values of the retimed clock $\phi_R$ and the shifted clock $\phi_S$ are compared in the exclusive NOR gate 42, which causes its output to assume a logic high value during the same complete cycle of the lock clock $\phi_L$.

The logic output signal 32 of the exclusive NOR gate 42 is applied to the data input terminal D of a latch such as the DQ flip-flop 30. The lock clock $\phi_L$ is also applied to the clock input terminal (>) of the latch 30. The logic high value of the exclusive NOR gate 42 is gated through the latch 30 to appear as a logic high value of the clock condition signal 20 upon the first rising transition of the lock clock signal $\phi_L$ which occurs after the missing logic "1" event.

Immediately following the missing logic "1" event in the master clock waveform $\phi_o$ as shown in FIG. 3, the master clock resumes its symmetrical and regular waveform. Thus, the clock condition signal 20 assumes a logic 1 value for only one complete cycle of the lock clock signal $\phi_L$. It can be seen that the clock error associated with the missing logic "1" event occurs one complete cycle of the lock clock $\phi_L$ after the trailing edge of the missing logic "1" bit. Thus, a clock error occurring within a single bit of the master clock $\phi_o$ is detected and reported to the processor substantially on a real time basis.

By similar analysis, a missing logic "0" event, as indicated in FIG. 3, causes a non-symmetrical extension of the logic 1 value of the divided clock $\phi_D$. The trailing edge of the master clock signal $\phi_o$ is delayed by a full clock cycle, causing a corresponding extension of the logic 1 value of the divided clock $\phi_D$. The logic 1 value of the retimed clock which is coincident with the missing logic "0" event is extended by one complete cycle of the lock clock $\phi_L$, which results in a non-symmetrical waveform. Both the retimed clock $\phi_R$ and the shifted clock $\phi_S$ assume a logic 1 value during the first full cycle of the lock clock waveform following the missing logic "0" event, which produces a logic 1 value on the exclusive NOR output 32. The logic 1 value of the exclusive NOR gate output is gated through the latch 30 and appears as a clock error signal during that complete cycle of the lock clock $\phi_L$.

A dead clock event, in which the output of the master clock oscillator $\phi_o$ assumes a continuous logic value, or a logic "1" value, produces a continuous logic 0 output on the DQ flip-flop 36, corresponding with a master clock cycle of unbounded period. The divided clock signal $\phi_D$ is constrained to logic 0 in the absence of a rising transition of the master clock $\phi_D$.

The lock clock $\phi_L$, however, continues to produce a regular and symmetrical clock pulse at its natural, unforced frequency, $F_L = F_o$, the frequency of the master clock $\phi_o$. The divided clock is retimed, forcing the retimed clock $\phi_R$ to logic 0 as shown in FIG. 6. Upon the first rising transition of the lock clock $\phi_L$ following the dead clock event, both $\phi_R$ and $\phi_S$ assume a logic 0 value as shown in FIG. 6 and FIG. 7. A comparison of the logic 0 values by the exclusive NOR gate 42 produces a logic 1 value on the exclusive NOR gate output 32. This logic 1 value is gated through the latch 30 to appear as a logic 1 value corresponding with a clock error condition upon the next rising transition of the lock clock $\phi_L$. In this instance, the output of the latch 30 assumes a logic 1 value continuously, thereby indicating the dead clock condition.

According to one aspect of the invention, the clock condition signal 20 is reported to the processor 14 which automatically substitutes a standby redundant master clock. The clock condition signal 20 may also be applied to a flag circuit to provide a visual indication of a master clock failure event to the system operator for troubleshooting a system failure and ruling out an external cause.

Although the invention has been described with reference to a specific clock monitoring circuit, and with reference to synchronous data transfer, the foregoing description is not intended to be construed in a limiting sense. Various modifications of the disclosed monitoring circuit as well as alternative applications thereof will be suggested to persons skilled in the art by the foregoing specification and illustration. It is therefore contemplated that the appended claims will cover any such modifications or embodiments that fall within the true scope of the invention.

What is claimed is:

1. Apparatus for detecting failure or malfunction of a master clock signal comprising, in combination:
   a free-running local oscillator having an unforced oscillation frequency substantially equal to the oscillation frequency of the master clock signal, said local oscillator including means responsive to the master clock signal for producing a lock clock signal synchronized with a logical transition of the master clock signal; and,
   a detector circuit including means responsive to the master clock signal and the lock clock signal, respectively, for producing a logical comparison of clock cycle waveforms derived from logical transitions of the master clock signal.

2. Apparatus for detecting failure or malfunction of a master clock signal as defined in claim 1, including:
   means for producing a divided clock signal in response to transitions of the master clock signal, said divided clock signal having a period of oscillation which is greater than the period of oscillation of the master clock signal and which is synchronized with a logical transition of the master clock signal;
   means coupled to the divided clock signal for phase shifting the divided clock signal and thereby producing a phase shifted counterpart signal; and,
   means for comparing the divided clock signal with the phase shifted counterpart signal.

3. Apparatus for detecting failure or malfunction of a master clock signal as defined in claim 2, said comparison means comprising an exclusive NOR gate having a first input connected to the divided clock signal, and having a second input connected to the phase shifted counterpart signal.

4. Apparatus for detecting failure or malfunction of a master clock signal as defined in claim 2, said means for producing a divided clock signal comprising a DQ flip-flop having a clock input terminal, a data input terminal, a data output terminal and a data complement output terminal, said data complement output terminal being connected to the data input terminal, and said clock input terminal being connected to receive the master clock signal.

5. Apparatus for detecting failure or malfunction of a master clock signal as defined in claim 2, said means for phase shifting the divided clock signal comprising:
   a first DQ flip-flop having a data input terminal connected to the divided clock signal, a clock input terminal and a data output terminal, said clock input signal being connected to said lock clock signal, and having a data output terminal for conducting the divided clock signal as retimed by the lock clock signal; and,
   a second DQ flip-flop having an input data terminal connected to the retimed, divided clock signal and having a clock input terminal connected to the lock clock signal, whereby said divided clock signal is phase shifted by one-half clock cycle in the first DQ flip-flop and by another half clock cycle in the second DQ flip-flop.

6. Apparatus for detecting failure or malfunction of a master clock signal as defined in claim 1, wherein said free-running local oscillator is a relaxation oscillator having an input node, a feedback capacitor being connected to said input node and a clock signal injection resistor being coupled between said input node and said master clock signal for applying an periodic injection signal to said input node.

7. Apparatus for detecting failure or malfunction of a master clock signal comprising:
   means coupled to the master clock signal for producing a divided clock signal having a period of oscillation which is greater than the period of oscillation of the master clock signal and which is synchronized with logical transitions of the master clock signal;
   means coupled to the divided clock signal for phase shifting the divided clock signal; and,
   means coupled to the divided clock signal and to the phase shifted divided clock signal for producing a comparison of the divided clock signal with its phase shifted counterpart.

8. Apparatus for detecting failure or malfunction of a master clock signal as defined in claim 7, including:
   a free-running oscillator for generating a local clock signal having an oscillation frequency substantially equal to the oscillation frequency of the master clock signal;
   injection means coupled between the master clock signal and the local clock generator for synchronizing the local clock signal with the master clock signal;
   an inverter coupled to the local clock oscillator for producing an inverted the local clock signal; and,
   the inverted local clock signal being coupled to said divided clock producing means and said phase shifting means for gating the divided clock signal and its phase shifted counterpart in synchronous relation with a logical transition of said inverted local clock signal.

9. In a data processing system in which digital data is transferred from a data source to a data processor synchronously with a master clock signal, the improvement comprising a free-running local oscillator having a natural oscillating frequency substantially equal to the master clock signal frequency, input injection means coupled between said master clock signal and said local oscillator for producing a lock clock signal in synchronous relation with a logical transition of the master clock signal; and, a detector circuit including means responsive to the master clock signal and the lock clock signal, respectively, for producing a logical comparison of clock cycle waveforms derived from the master clock signal.

10. A method for detecting failure or malfunction of a master clock signal comprising the steps:
 producing a divided clock signal having a period of oscillation which is greater than the period of oscillation of the master clock signal and which is synchronized with transitions of the master clock signal;
 phase shifting the divided clock signal; and,
 comparing the divided clock signal with its phase shifted counterpart.

11. A method for detecting failure or malfunction of a master clock signal as defined in claim 10 including the steps:
 generating a local clock signal having an oscillation frequency substantially equal to the oscillation frequency of the master clock signal;
 synchronizing the local clock signal with the master clock signal;
 inverting the local clock signal; and,
 gating the divided clock signal and its phase shifted counterpart with the inverted local clock signal.

12. A method for detecting failure or malfunction of a master clock signal comprising the steps:
 producing a free-running local clock signal having an unforced oscillation frequency substantially equal to the oscillation frequency of the master clock signal;
 synchronizing the local clock signal with a logical transition of the master clock signal;
 deriving a divided clock signal from the master clock signal;
 synchronizing the divided clock signal with a logical transition of the local clock signal; and,
 producing a logical comparison of clock cycle waveform events which occur in the divided clock signal.

* * * * *